US012696921B2

(12) United States Patent
Chatard et al.

(10) Patent No.: US 12,696,921 B2
(45) Date of Patent: Aug. 4, 2026

(54) FOAMABLE COMPOSITION AND FOAM

(71) Applicant: ADM WILD Europe Gmbh & Co. KG, Eppelheim/Heidelberg (DE)

(72) Inventors: Dominique Chatard, Eppelheim/Heidelberg (DE); Sandra Juergens, Eppelheim (DE); Frank Tremmel, Eppelheim (DE); Jens Maeder, Eppelheim (DE); Juergen Kraut, Eppelheim (DE); Frederic Barreau, Eppelheim (DE)

(73) Assignee: ADM WILD Europe GmbH & Co. KG, Eppelheim/Heidelberg (DE)

( * ) Notice: Subject to any disclaimer, the term of this patent is extended or adjusted under 35 U.S.C. 154(b) by 543 days.

(21) Appl. No.: 17/765,779

(22) PCT Filed: Oct. 2, 2020

(86) PCT No.: PCT/EP2020/077704
§ 371 (c)(1),
(2) Date: Mar. 31, 2022

(87) PCT Pub. No.: WO2021/064196
PCT Pub. Date: Apr. 8, 2021

(65) Prior Publication Data
US 2022/0338528 A1 Oct. 27, 2022

(30) Foreign Application Priority Data
Oct. 2, 2019 (EP) ..................................... 19201052

(51) Int. Cl.
| | |
|---|---|
| *A23L 29/20* | (2016.01) |
| *A23L 7/152* | (2016.01) |
| *A23L 29/231* | (2016.01) |
| *A23L 29/269* | (2016.01) |
| *A23L 33/21* | (2016.01) |
| *A23P 30/40* | (2016.01) |

(52) U.S. Cl.
CPC .............. *A23P 30/40* (2016.08); *A23L 7/152* (2016.08); *A23L 29/231* (2016.08); *A23L 29/269* (2016.08); *A23L 33/21* (2016.08)

(58) Field of Classification Search
CPC ... A23L 7/10; A23L 2/52; A23L 29/20; A23L 29/231; A23L 29/269; A23L 33/10; A23L 33/21; A23L 7/152; A23L 7/115; A23P 30/40
USPC .......................... 426/590, 622, 329, 421, 564
See application file for complete search history.

(56) References Cited

U.S. PATENT DOCUMENTS

| | | | | |
|---|---|---|---|---|
| 6,516,974 | B2 | 2/2003 | Straus | |
| 6,787,151 | B2 * | 9/2004 | Meijer | ..................... A23G 1/44 424/439 |
| 8,192,841 | B2 * | 6/2012 | Amundson | .......... A61K 8/0208 428/402.2 |
| 2006/0000361 | A1 | 1/2006 | Kutyev | |
| 2010/0173046 | A1 | 7/2010 | Lisa | |
| 2010/0310746 | A1 | 12/2010 | Leser et al. | |
| 2017/0295835 | A1 * | 10/2017 | Durbin | ................... A23P 30/40 |

FOREIGN PATENT DOCUMENTS

| | | |
|---|---|---|
| BR | 99079895 A | 2/2002 |
| BR | 102020013208 | 10/2020 |
| CN | 104719919 | 6/2015 |
| CN | 106998732 A | 8/2017 |
| CN | 108378296 A | 8/2018 |
| CN | 109123414 A | 1/2019 |
| CN | 110037083 A | 7/2019 |
| EP | 1284106 | 2/2003 |
| EP | 1978819 B1 | 10/2008 |
| JP | S62224241 | 10/1987 |
| JP | 2005151835 A | 6/2005 |
| JP | 2005278601 | 10/2005 |
| JP | 2011101637 | 5/2011 |
| JP | 2016158550 A | 9/2016 |
| JP | 2020163927 | 10/2020 |
| RU | 2620643 | 5/2017 |
| RU | 2655840 | 5/2018 |
| WO | 03013275 A1 | 2/2003 |
| WO | 03052046 | 6/2003 |
| WO | 2008046729 | 4/2008 |
| WO | 2013034520 | 3/2013 |

(Continued)

OTHER PUBLICATIONS

FoodData Central, U.S. Department of Agriculture, Cocoa, dry powder, unsweetened, published Apr. 1, 2019, pp. 1-7. https://fdc.nal.usda.gov/fdc-app.html#/food-details/169593/nutrients (Year: 2019).*
Lecumberri, Elena, Raquel Mateos, Maria Izquierdo-Pulido, Pilar Ruperez, Luis Goya and Laura Bravo, Dietary fibre composition, antioxidant capacity and physico-chemical properties of a fibre-rich product form cocoa (*Theobroma cacao* L.), Food Chemistry 104 (2007) 948-954. (Year: 2007).*
USDA FoodData Central, Black Pepper, ROUNDY'S, Herbs & Spices, Finlay Extracts & Ingredients USA, Inc., FDC ID: 2157235, U.S. Department of Agriculture, URL: https://fdc.nal.usda.gov/fdc-app.html#/food-details/2157235/nutrients, published Oct. 28, 2021.
USDA FoodData Central, Minced Garlic, GOYA, Herbs & Spices, Goya Foods, Inc., FDC ID: 2151046, U.S. Department of Agriculture, URL: https://fdc.nal.usda.gov/fdc-app.html#/food-details/2151046/nutrients, published Oct. 28, 2021.

(Continued)

*Primary Examiner* — Hong T Yoo
(74) *Attorney, Agent, or Firm* — Saul Ewing LLP; Kathryn Doyle; Domingos J. Silva

(57) ABSTRACT

The present invention relates to a foamable composition comprising 0.05 to 10 wt % of a plant germ flour, 0.1 to 15 wt % of a thickening agent, 0.1 to 35 wt % of a natural fiber, and water, wherein each wt % is based on the total weight of the composition. The invention further relates to: (a) a foam obtainable from said foamable composition; (b) a method for producing said foamable composition comprising mixing the ingredients with water; (c) the use of said foamable composition or said foam in a food product; and (d) a food product comprising said foamable composition or said foam.

9 Claims, No Drawings

(56) References Cited

FOREIGN PATENT DOCUMENTS

| | | |
|---|---|---|
| WO | 2014100146 | 6/2014 |
| WO | 2016049577 A1 | 3/2016 |

OTHER PUBLICATIONS

Minced Onion, Herbs & Spices, Stonemill, FDC ID: 731104, U.S. Department of Agriculture, URL: https://fdc.nal.usda.gov/fdc-app.html#/food-details/731104/nutrients, published Dec. 6, 2019.
Standard Tables of Food Compositions in Japan 2020, Eighth Revised Edition; Beverages/Cocoa/Pure Powder. (English Translation).

* cited by examiner

FOAMABLE COMPOSITION AND FOAM

CROSS-REFERENCE TO RELATED APPLICATIONS

The present application is a 35 U.S.C. § 371 national phase application from, and claims priority to, International Application No. PCT/EP2020/077704, filed Oct. 2, 2020, and published under PCT Article 21(2) in English, which claims priority under 35 U.S.C. § 119(e) to European Patent Application No. 19201052.8, filed on Oct. 2, 2019, all of which applications are incorporated herein by reference in their entireties.

BACKGROUND OF THE INVENTION

Stabilized gas bubbles in a food matrix build foam, which is often considered as a highly desirable attribute. Such foamed food products provide a unique texture and are commonly used in toppings, icings, mousses, fillings or gravies for desserts, meals or beverages. The benefits of foamed food products relate to softer and smoother texture, enhanced flavour delivery and altered rheology. Therefore, the ability to entrap gas bubbles in a food matrix and the stability of the foam are important in order to provide a pleasing product for the consumer. Common foamed food products are generally formed by bubbling, whipping, shaking or other gas incorporation methods, such as gas injection.

However, further additives are required to stabilize the foam. Surface active agents have commonly been used to stabilize foamed food products. In particular, the products are mainly based on proteins from animal origin and/or fat to provide a whippable emulsion stabilized with various thickeners and emulsifiers for achieving a stable foamy structure with large overrun. Consequently, those products have a long list of ingredients including chemical additives, which are of increased concerns by health-conscious consumers.

Nowadays public interest is focused on nutritional aspects of processed foods such as energy density, fat-free and without cholesterol, as well as absence of potential allergens. The consumer's demand for healthy nutritional foods that retain the quality of the corresponding traditional formulation has led to the development of a large number of potential fat replacers based on proteins, polyesters, texturizing agents and a variety of other approaches which in turn are losing acceptance by consumers in today's market who are also looking for fewer additives in products, in an attempt to live healthier lifestyles.

EP-A-1 738 650 relates to aerated food compositions comprising protein, oil, and cyclodextrin. The compositions comprise a significant amount of oil.

US-A-2013/0251879 describes foaming juice compositions, which produce a layer of foam upon the juice product. Said compositions contain a juice product and a food grade additive.

FR-A-2 710 501 discloses a fruit-flavoured cream comprising fruit puree, water, sugar, pectin, texturizers and emulsifiers; however, the achieved overrun is not above 150%.

FR-A-2 985 885 relates to foamed food compositions. However, said foamed food compositions contain a stabilizing mixture comprising a modified starch, at least one sucrose ester and xanthan gum and therefore does not meet the consumer's demands.

EP-A-0 274 348 discloses a process for preparing a dietary foam product, which contains fat, proteins and a thickening agent. Again, said compositions contain fat, which does not meet the consumer's demands.

WO-A-2011/044557 discloses whippable food products containing fat, fiber, protein, emulsifier, sweetener and stabilizer.

U.S. Pat. No. 5,789,004 discloses a stabilizer composition for whipped toppings containing microcrystalline cellulose coprocessed with guar and microcrystalline cellulose coprocessed with carboxymethylcellulose.

U.S. Pat. No. 5,000,974 relates to low-calorie aerated foods comprising an aeratable fruit base, a hydrocolloid combination of locust-bean flour (gum), pectin, preferably having a degree of esterification between 35 to 38%, carrageenans and emulsifier. The product further has an overrun of 70 to 150%. This concept implies the use of several additives including chemical emulsifiers and carrageenan, all with decreasing acceptance from the customer. Furthermore, the poor thermal stability of carrageenan in acidic conditions limits the application field. Also, a homogenization step is required in the preparation of the food product.

CN 108 378 296 A discloses a powder comprising various components selected from natural fibers and fruit or vegetable powder. CN 109 123 414 A discloses a similar powder composition comprising specifically oat fiber and yeast powder. WO 03/0132275 A discloses an Italian dressing. US 2010/173046 A1 discloses a food product, which does not contain germ flour or a thickener.

BRIEF SUMMARY OF THE INVENTION

The present invention relates to a foamable composition, a method for producing said foamable composition, a foam, the use of said foamable composition and a food product comprising said foamable composition.

DETAILED DESCRIPTION OF THE INVENTION

All of the aerated food product known today contain additives, which do not meet the consumer's desire of food products originating from plants. In addition, in view of a healthy diet, consumers are increasingly looking for delicious alternatives without allergen, which are fat free and a source of fiber have a low energy content and contain fewer additives.

The object of the present invention is therefore to provide a composition having a low fat content, a low energy content, a high overrun and which can provide a source for fiber and form a stable foam having desirable organoleptic characteristics.

Said object is solved by a foamable composition comprising 0.05 to 10 wt % of a plant germ flour, 0.1 to 15 wt % of a thickening agent, 0.1 to 35 wt % of a natural fiber, and water, based on the total weight of the composition. Accordingly the composition of the present invention is typically an aqueous composition.

Surprisingly, the foamable composition in accordance with the present invention has a low fat and energy content, a high overrun and forms a stable foam. In addition, it is a low-energy source of fiber.

Said object is further solved by a foam obtainable from said foamable composition, a method of producing said foamable composition, the use of said foamable composition in a food product and a food product comprising said foamable composition.

Preferred embodiments are described elsewhere herein.

In a preferred embodiment in accordance with any of the above or below embodiments, the foamable composition further comprises 0.1 to 50 wt % of a food extract or an extract of an edible plant or part of an edible plant, based on the total weight of the composition, wherein the edible plant is selected from the group consisting of a vegetable, a fruit, a herb, a spice, a seed, tea, cocoa and coffee. Preferably, the foamable composition comprises 0.1 to 50 wt % of an extract of an edible plant or part of an edible plant, based on the total weight of the composition. In a more preferred embodiment in combination with any of the above or below embodiments, the edible plant is a herb, a vegetable or a fruit, more preferably a herb or a fruit.

The plant extract can be selected from a juice, a puree, a concentrate, an infusion, a powder and a fermentat/brew.

According to the present invention, the term "plant extract" is used representatively for all products that are obtained from an edible plant or part of an edible plant by squeezing or by means of an extraction with a solvent, such as with maceration or percolation.

Suitable solvents for an extraction are water, alcohols, such as methanol, ethanol or isopropyl alcohol, or chlorinated solvents, such as dichloromethane, as well as acetone, acetylacetone, ethyl acetate, ammonia or glacial acetic acid, but also supercritical carbon dioxide. Mixtures of the solvents mentioned can also be used. In a preferred embodiment, in combination with any one of the embodiments listed above or below, water or a mixture of water with methanol or ethanol is used.

The extraction is normally carried out at temperatures of 25° C. to, where applicable, as high as the boiling point of the solvent used.

The extraction is normally carried out for 2 to 8 h. Preferably, the extraction is carried out for 3 to 6 h, more preferably for 4 to 5 h.

In order to achieve the highest possible yield, the plant material can be extracted a number of times. Preferably, the extraction is repeated 2 to 6 times, more preferably 3 times. In this case, it is also possible to use different solvents in the various extraction steps.

A maceration procedure is normally performed for five to nine days, preferably for seven days, at room temperature with a mixture of water and ethanol, by pouring the solvent mixture over the plant elements and letting this stand for the period of time mentioned.

According to the present invention, a percolation of the plant parts is normally achieved by treating the parts with water at 95 to 100° C. for four to five hours by conducting the water through the fruit or plant parts.

The crude product obtained from an extraction with a solvent, such as a maceration or percolation, can also be concentrated and/or dried and/or further processed before use. The further processing can, for example, include cleaning steps known to the person skilled in the art, such as centrifugation, filtration and decanting, in order to remove suspended materials from the extract. Chromatography, such as column chromatography, gas chromatography or HPLC or steam distillation may also be used for purification. In a preferred embodiment the crude product is used without further purification steps.

An extract obtained in this way can subsequently be further processed into a dry extract. To produce the dry extract, the solvent can be withdrawn from the liquid raw extract, the concentrated extract or the cleaned extract by, for example, spray drying, freeze drying or vacuum drying.

The plant extract used according to the present invention may also include a plant juice. The term "juice" is used representatively for the natural fluid, fluid content, or liquid part that can be obtained from a plant or one of its parts, by squeezing, pressing or comminuting.

The plant extract used according to the present invention may also include a plant concentrate. The term "concentrate" is used representatively for all products that are obtained from a plant by means of removal of water from the fresh plant or from the respective juice. A dry plant product, such as a powder, is also included in the term "concentrate".

In a preferred embodiment in accordance with any of the above or below embodiments, the foamable composition further comprises an extract of an edible plant or part of an edible plant.

In a preferred embodiment in accordance with any of the above or below embodiments, an extract of an edible plant or part of an edible plant is an extract of a plant selected from the group consisting of a vegetable, a fruit, a herb, a spice, a seed, tea, cocoa and coffee, more preferably a vegetable, a fruit, a herb, tea and coffee.

In a further preferred embodiment in accordance with any of the above or below embodiments, the extract is a fruit extract and the fruit is selected from berries, e.g. açai berry blackberry, blackcurrant, blueberry, boysenberry, cranberry, elderberry, grape, gooseberry, kiwi, raspberry, redcurrant or strawberry; citrus fruits, e.g. blood orange, bitter orange, citron, clementine, grapefruit, pink grapefruit, kumquat, lemon, lime, mandarin, or orange; drupes, e.g. acerola, apricot, cherry, coconut, coffee, date, lychee, mango, mirabelle, nectarine, olive, peach or plum; melons, e.g. canary melon, cantaloupe melon, honeydew melon or watermelon; pomes, e.g. apples, pears, quince or chokeberry; succulent fruits, e.g. dragon fruit or prickly pear fruit; tropical and tropical-like fruits, e.g. banana, cacao, cherimoya, cashew apple, fig, guava, jackfruit, papaya, passionfruit, persimmon, pineapple, pomegranate, purple mangosteen, star fruit, tamarind or vanilla; plants with edible fruit-like structures, e.g. rhubarb; and nuts and nut-like fruits and seeds, e.g. chestnut, hazelnut, almond, cashew, coconut, pecan nut, pistachio, walnut, pine nut, macadamia, tonka bean or peanut. Preferably, the fruit is selected from berries such as raspberry, strawberry, blackcurrant or blueberry, from drupes such as apricot, cherry, coconut, coffee, lychee, mango, mirabelle, nectarine, olive, peach or plum, from pomes such as apples, pears or quince, from tropical fruits such as passion fruit, pineapple, banana, cacao, passionfruit, pomegranate or vanilla, citrus fruits such as orange, bitter orange, citron, grapefruit, pink grapefruit, lemon, lime or mandarin, from plants with edible fruit-like structures such as rhubarb, nuts or nut-like fruits and from seeds such as chestnut, hazelnut, almond, coconut, pecan nut, pistachio or peanut.

In a preferred embodiment in accordance with any of the above or below embodiments, the extract is an extract of edible parts from a vegetable e.g., bulbs, flowers, fungi, leaves, roots, seeds, stems or tubers such as, but not limited to amaranth, artichoke, asparagus, avocado, azuki bean, beet greens, beetroot, bell pepper/capsicums, broccoli, brussels sprouts, cabbages, carrots, cauliflower, celeriac, celery, chilli peppers, courgette, cucumber, eggplant, fennel, garlic, ginger, kohlrabi, leeks, lettuce, liquorice, melons, mushrooms, okra, onions, parsnips, peas, potatoes, puha, pumpkins, radishes, rhubarb, salad green, shallot, spinach, spring onions, sprouted beans and seeds, sweet corn, taro, tomatoes, topinambur, turnips, watercress, witloof/chicory, or yams. Preferably, the vegetable is selected from artichoke, asparagus, avocado, beet greens, beetroot, bell pepper/capsicums, broccoli, brussels sprouts, cabbages, carrots, cauliflower, celeriac, celery, chilli peppers, courgette, cucumber, eggplant, fennel, garlic, ginger, kohlrabi, leeks, melons, mushrooms, onions, parsnips, peas, potatoes, pumpkins, radishes, rhubarb, shallot, spinach, spring onions, sweet corn, tomatoes, turnips.

In another preferred embodiment in accordance with any of the above or below embodiments, the herb is selected from the group consisting of basil, borage, celery, chervil, chives, coriander, curry, dill, Fenugreek, garlic, hibiscus, laurel, lavender, lemongrass, lovage, majoram, peppermint, spearmint, oregano, parsley, rosemary, sage, savory, tarragon and thyme. Preferred herbs are basil, borage, celery, chervil, chives, coriander, curry, dill, Fenugreek, garlic, hibiscus, kaffir lime, laurel, lavender, lemongrass, lovage, majoram, peppermint, spearmint, oregano, parsley, rosemary, sage, savory, tarragon and thyme or a mixture thereof e. g. herbes de provence.

According to the present invention, the term "herb" encompasses the green leafy part as well as the flower such as lavender flowers.

In another preferred embodiment in accordance with any of the above or below embodiments, suitable spices are selected from the group consisting of aniseed, cardamom, celery, chillies, cinnamon, cassia, cloves, coriander, cumin, dill, fennel, fenugreek, galangal, garlic, ginger, grains of paradise, horseradish, juniper berries, mace/nutmeg, mustard, nigella, onion, paprika, pepper (green, black, white, red), pink pepper, sichuan pepper, pimento, poppy seed, saffron, sesame seed, star anise, sumac, tonka bean, turmeric, vanilla pod and wasabi. Preferably, the spice is selected from aniseed, cardamom, celery, chillies, cinnamon, cloves, coriander, cumin, dill, fennel, fenugreek, galangal, garlic, ginger, horseradish, juniper berries, mace/nutmeg, mustard, onion, paprika, pepper, pimento, saffron, star anise, sumac, turmeric, vanilla pod and wasabi.

According to the present invention, the term "spice" encompasses a seed, fruit, root, stem, bark, flower or parts thereof which are primarily used for flavoring, coloring or preserving food.

In a further preferred embodiment in accordance with any of the above or below embodiments, the extract of an edible plant or part of an edible plant is a mixture of one or more of the above mentioned plant extract.

In a further preferred embodiment in accordance with any of the above or below embodiments, the foamable composition further comprises a food extract.

In another preferred embodiment in accordance with any of the above or below embodiments, the food extract is a dairy product, primarily produced from mammals such as cattle, water buffaloes, goats, sheep, camel or a mixture thereof. Suitable dairy products are a milk product, a cream product, a butter product, a fermented dairy product, a custard product, a cheese product, and a whey product. Preferably, the dairy product is selected from a spreadable cheese product, a processed cheese product, a cheese powder, a cream concentrate, a sweetened milk concentrate, a condensed milk, a cream cheese, a yoghurt or butter.

In a further preferred embodiment in accordance with any of the above or below embodiments, the food extract is a condiment or a sauce, such as aioli, ajvar, chatni, chutney, green sauce, guacamole, HP sauce, hummus, ketchup, marmite, pesto, tahini, tapenade, garam masala, tandoori masala, or Raz el-Hanout.

In a preferred embodiment in accordance with any of the above or below embodiments, the food extract and the extract of an edible plant or parts thereof is present in the foamable composition in an amount of 0.1 to 45 wt % based on the total weight of the composition, more preferable in an amount of 1.0 to 40 wt %, and most preferably 1.1 to 35 wt % based on the total weight of the composition.

In a preferred embodiment in accordance with any of the above or below embodiments, the foamable composition further comprises 1.0 to 50 wt % of at least one additional ingredient selected from a sweetener including sugar and sugar syrup, a colorant including liquids, powders, gels, solids, or pastes (including e. g. caramel syrup, black carrot, paprika, turmeric, saffron, spirulina, grape color extract), a flavouring agent including liquids, powders, gels, solids, or pastes including taste modifier, a pH regulator, an acidifying agent, a preservative, a mineral, including salt, an antioxidant, and a natural organic acid based on the total weight of the composition. Preferably, the additional ingredient is further selected from a substance or solution with a positive nutritional-physiological or health effect. More preferably, the foamable composition of the present invention comprises 2 to 50 wt % of the additional ingredient, particularly preferably the foamable composition comprises 4 to 40 wt % of a sweetener based on the total weight of the composition.

In a preferred embodiment in accordance with any of the above or below embodiments, the sweetener is selected from the group consisting of a natural carbohydrate, a natural sugar substitute, an artificial sugar or a mixture thereof.

Suitable natural carbohydrates include refined mono- and disaccharides such as allulose, fructose, glucose, lactose, maltose, saccharose, tagatose, hydrolyzed saccharose concentrate, invert sugar syrup, glucose syrup, maltodextrin or corn syrup solids. Suitable natural sugar substitutes, as used herein, include natural syrup containing carbohydrates such as honey, syrup from processed fruit juice or fruit juice concentrate (e.g. Fruit-up®, apple juice concentrate, grape juice concentrate) and syrup from vegetable such as cane sugar, beet sugar, cane juice, beet juice, or agave nectar, tree syrup such as maple syrup, golden syrup, caramel sugar syrup, sugar alcohols such as arabitol, erythritol, glycerol, isomalt, lactitol, maltitol, mannitol, sorbitol or xylitol. Suitable artificial sweeteners include acesulfame potassium, aspartame, cyclamate, mogroside, saccharine, stevia extract, stevioside, rebaudiosides and sucralose.

In a preferred embodiment in accordance with any of the embodiments described above or below, the carbohydrate is not or only slightly colored and does not have a taste of its own.

In a particular preferred embodiment in accordance with any of the embodiments described above or below, the foamable composition of the present invention comprises 2 to 30 wt % of a carbohydrate, 0.1 to 2.0 wt % of a colorant, 0.1 to 3 wt % of a flavouring agent and 0.1 to 1 wt % of a pH regulator, based on the total weight of the composition.

According to the invention, the term "a substance or solution with a positive nutritional-physiological or health effect" is understood to mean a substance or a solution that has one or more substances with positive nutritional-physiological or health effects. Components with a positive nutritional-physiological or health effect are, e.g., vitamins, minerals, dietary fibres, grape seed extract, fruit extract, olive extract, secondary phytonutrients, such as, e.g., polyphenols, Omega-3 fatty acids, phytosterols, tocopherols, isoflavones, carotenoids, blood sugar-regulating molecules, sugar alcohols, starter cultures with probiotic effect such as lactic acid and bifido bacteria e.g., *Lactobacillus acidophilus, Lactobacillus sakei, Lactobacillus casei, Lactobacillus rhamno-*

*sus, Bifidobacterium longum, Bifidobacterium lactis, Bifidobacterium rhamnosus, Bifidobacterium breve*, or mixtures of these.

In another preferred embodiment in combination with any of the above or below embodiments, the plant germ flour is a carob germ flour, wheat germ flour, maize (corn) germ flour, rice germ flour, rye germ flour, oat germ flour, barley germ flour, sorghum germ flour, chickpea germ flour, millet germ flour or a mixture thereof. More preferably, the plant germ flour is carob germ flour or wheat germ flour. Preferably, the plant germ flour does not contain sugars.

In a further preferred embodiment in combination with any of the above or below embodiments, the plant germ flour is present in an amount of 0.05 to 10 wt %, more preferably 0.5 to 5 wt %, particularly preferably 0.7 to 4 wt %, based on the total weight of the composition. In particular, the plant germ flour is carob germ flour and is present in an amount of 0.8 to 3 wt %, based on the total weight of the composition, or the plant germ flour is wheat germ flour and is present in an amount of 1.0 to 3.5 wt %, based on the total weight of the composition.

In another preferred embodiment in combination with any of the above or below embodiments, the thickening agent is a polysaccharide. More preferably, the thickening agent is xanthan gum, pectin, gellan gum, dextran, pullulan or a mixture thereof. Particularly preferably the thickening agent is a mixture of pectin and xanthan gum; in particular the pectin is a high methoxyl (HM-) pectin. HM-pectins have a degree of esterification above 50%.

In a further preferred embodiment in combination with any of the above or below embodiments, the thickening agent is a mixture of high methoxyl pectin and a further thickening agent in a weight ratio of 1000:1 to 5:1, more preferably 70:1 to 7:1, in particular 50:1 to 10:1. More preferably, the further thickening agent is selected from xanthan gum, gellan gum, dextran or pullulan.

In a preferred embodiment in combination with any of the above or below embodiments, the thickening agent is present in an amount of 0.1 to 15 wt %, more preferably 0.5 to 10 wt %, particularly preferably 0.7 to 5 wt %, based on the total weight of the composition. In particular, the thickening agent is a mixture of pectin and xanthan gum, wherein pectin is present in an amount of 0.3 to 2 wt %, based on the total weight of the composition, and xanthan gum is present in an amount of 0.01 to 1 wt %, based on the total weight of the composition.

In another preferred embodiment in combination with any of the above or below embodiments, the natural fiber is an edible indigestible soluble or insoluble carbohydrate polymer or a mixture thereof. The natural fiber is selected from a plant source or produced by microorganisms such as resistant starch (RS), or a non-starch polysaccharide (NSP) with high molar weight or a low molar weight non-starch polysaccharide (prebiotics). In a preferred embodiment in combination with any of the above or below embodiments, the natural fiber is a non-starch polysaccharide with high molar weight which is selected from a citrus fiber, a apple fiber, a pea fiber, a potato fiber, a wheat fiber, pectin, a beta-Glucan (obtained from barley, oat, rye, from yeast/moulds fermentation), fiber processed from psyllium seed husks and a mixture thereof. In a further preferred embodiment in combination with any of the above or below embodiments, the natural fiber is a low molar weight non-starch polysaccharide which is selected from resistant oligosaccharide (FOS/GOS), inulin (obtained from chicory, wheat), resistant maltodextrins/dextrin (Fibersol®) and polydexrose and a mixture thereof.

In a further preferred embodiment in combination with any of the above or below embodiments, the fiber is present in an amount of 0.1 to 35 wt %, more preferably 0.5 to 20 wt %, particularly preferably 0.6 to 15 wt %, based on the total weight of the composition. In particular, the fiber is a mixture of a soluble fiber and an insoluble fiber, wherein the soluble fiber is present in an amount of 0.1 to 10 wt %, based on the total weight of the composition, and the insoluble fiber is present in an amount 0.1 to 8 wt %, based on the total weight of the composition.

In a preferred embodiment in combination with any of the above or below embodiments, the weight ratio of the soluble fiber to the thickening agent is 1:10 to 35:1, more preferably 1:5 to 10:1.

In another preferred embodiment in combination with any of the above or below embodiments, the amount of fat from the ingredients in the composition is 0.01 to 0.5 wt %, based on the total weight of the composition.

In a further preferred embodiment in combination with any of the above or below embodiments, the amount of protein from the ingredients in the composition is 0.1 to 1 wt %, based on the total weight of the composition.

In another preferred embodiment in combination with any of the above or below embodiments, the amount of carbohydrates from the ingredients in the composition is below 30 wt %, more preferably below 20 wt %, particularly preferably below 12 wt %, based on the total weight of the composition.

The present invention further provides a method for preparing the foamable composition of the present invention. In a preferred embodiment in combination with any of the above or below embodiments, the method comprises:

a) dispersing the plant germ flour, the thickening agent and the natural fiber in water, b) optionally adding the dispersion of step a) to an aqueous solution of the extract of an edible plant or parts thereof or food extract and mixing the composition, c) optionally adding additional ingredients to the dispersion of step a) or step b), and d) heating the resulting mixture.

In an alternatively preferred embodiment in combination with any of the above or below embodiments, the method comprises:

e) dispersing the plant germ flour in water, f) dispersing the thickening agent in water, g) dispersing the natural fiber in water, h) blending the dispersions of steps e) to g) and mixing the resulting composition, i) optionally adding the composition of step h) to an aqueous solution of the extract of an edible plant or parts thereof or food extract and mixing the composition, j) optionally adding additional ingredients to the composition of step h) or step i), and k) heating the resulting mixture.

In the above processes, the mixing equipment may be any commonly available mechanical device suitable for mixing food ingredients known by a person of ordinary skill in the art.

According to the specific formulation and available equipment the above steps a) to d) or e) to k) might be carried out in a different order as indicated, although it is preferred to follow the above order.

An important characteristic of the foamable composition according to the invention is the "storability at ambient temperature" for high acid composition as well as for low acid composition. Thus an appropriate thermal treatment to eliminate potential spoilage microorganisms for insuring the product safety and microbiological stability over time during the shelf-life without having a detrimental impact on the organoleptic quality and desired foam performance is required. In this respect a high temperature process with a short holding time in order to provide the commercial sterility of the product shall be adopted.

The temperature and the time may be adjusted according to the given product characteristics based on pH, water activity and specific product formulation within the specific temperature time combination given in the table below.

TABLE 1

| Process parameter for UHT and Pasteurization treatment | | |
|---|---|---|
| | Pasteurization | UHT sterilization |
| Temperature | 80° C.-105° C. | 120-150° C. |
| Time | 30 sec-15 min | 2 sec-240 sec |

In a preferred embodiment of the above method in combination with any of the above or below embodiments, in order to obtain the required microbiological sterility, the resulting mixture is heated up to a temperature in the range of 80° C. to 105° C., more preferably in the range of 85° C. to 98° C. for high acid foamable composition and in the range of 120° C. to 150° C., more preferably in the range of 125° C. to 140° C. for low acid foamable composition.

It is remarkable that the above process does not require any homogenization step and thus reduces significantly the required cost for investment, operation as well as for maintenance.

For storage of the foamable composition, the mixture is cooled to a temperature equal to or lower than the maximal aseptic filling temperature. Preferably, the aseptic filling temperature is below 40° C., more preferably below 15° C.

The present invention further provides a method for preparing a foam by using the foamable composition of the present invention, the method comprising the following steps
  a) dosing a pressurized gas to a pre-determined amount between 2.5 and 3.5 wt % of the foamable composition in a tightly closed container through a valve,
  b) submitting said gassed foamable composition to an agitation,
  c) optionally waiting for obtaining partly a partial pressure equilibrium between the gassed mixture and the head space volume, and
  d) dispensing said pressurized cold composition through a valve of the container in head down position by gently actuating the lever in order to obtain a foamed food product with an overrun larger than 350%.

In a preferred embodiment in combination with any of the above or below embodiments, the gassed mixture of step a) is subjected to agitation until a partial pressure equilibrium between the gassed mixture and the head space volume is obtained.

In a further preferred embodiment in combination with any of the above or below embodiments, the pressure of the pressurized gas in step g) is 10 to $20 \times 10^5$ Pa, more preferably 14 to $18 \times 10^5$ Pa.

The present invention further relates to a foam. In a preferred embodiment in combination with any of the above or below embodiments, the foam comprises an aqueous continuous phase of from 9 to 22 vol % and a gaseous phase from 78 to 91 vol %. The overrun of the foam is preferably from 3.5 to 10, i.e. 350 to 1000%.

In a further preferred embodiment in combination with any of the above or below embodiments, the gaseous phase is a gas selected from air, nitrogen, carbon dioxide, nitrous oxide, helium, oxygen and mixtures thereof. More preferably, the gas is selected from nitrogen, nitrous oxide, carbon dioxide and mixtures thereof.

Accordingly, the present invention also provides pressurized container, comprising the foamable composition in accordance with any one of claims 1 to 9 and a pressurized gas at a pressure of from 10 to $30 \times 10^5$ Pa.

Preferably, the pressurized gas is selected among air, nitrogen, carbon dioxide, nitrous oxide, helium, oxygen and mixtures thereof.

Such a pressurized container may comprise a valve allowing to introduce the pressurized gas and an opening for dispensing the foamed composition.

In another preferred embodiment in combination with any of the above or below embodiments, the foam has a caloric density of less than 4 kJ/ml, more preferably less than 2 kJ/ml, particularly preferably less than 0.8 kJ/ml.

The foam of the present invention has an overrun of 350 to 1000% and is stable during storage at a temperature of 20 to 80° C. for at least 30 minutes.

Foams created with such formulations have an enhanced overrun and are surprisingly stable and versatile even when applied to acidic or hot food.

In a further preferred embodiment in combination with any of the above or below embodiments, the foamable composition of the present invention can be placed in a ready-to-use pressurized aseptic container, such as an aerosol can with a dispensing device. Alternatively, the foamable composition of the present invention can be placed in a non-pressurized aseptic packaging, and the foamable composition is dosed at the point of use in a container adequate to be pressurized with a controlled quantity of gas.

When the dispenser's valve is slowly pressed, the mixture is expelled through the orifices by the high pressure inside. The change in pressure causes some of the dissolved gas to return to bubbles, effectively fluffing up the composition, producing small bubbles surrounded by a flexible, relatively stable film. The volume extension is considered as a key characteristic of foamable composition and is usually defined as "overrun".

Overrun refers to the volume of gas added to the foamable composition and it quantifies the foaming capacity of the composition. The overrun is measured according to following equation: (weight of 100 ml foamable composition–weight of 100 ml foamed composition)×100/(weight of 100 ml foamed composition). Alternatively following equation based on the volume can also be used: Overrun= 100% ×($V_{foamed\ composition}$–$V_{foamable\ composition}$)/ $V_{foamable\ composition}$. It is also reported as a percentage value.

The disclosed compositions and uses of the present invention are such that they have an overrun of at least 350%.

In this regard, the foams obtained in accordance with the present invention do show a viscosity recovery behavior. This means that during the dispensing process the foamed composition displays a highly satisfactory flow property, so that dispensing can proceed without problem. Once dispensed, however, the viscosity of the foam increases again to a level that in particular the shape of the dispensed foam can be retained for a desired period of time. The foam accordingly is stable, as described herein.

For the practice, however, foam capacity is only relevant if the stability of the foam is also given, to allow for preparing, serving and tasting the foamed product within reasonable time.

The foam stability is influenced by other intrinsic properties from the foamable composition as those impacting the foaming capacity. Therefore the foam stability is also a key performance indicator to be determined. The foam stability has been measured as the relative change in the foam height in a cup at ambient temperature over time.

In certain embodiments, the foam maintains at least about 80% of its height after 60 minutes. In further preferred embodiments, the foam maintains at least about 90% of its height after 60 minutes. In certain embodiments, the foam maintains at least about 60% of its height on a food with a serving temperature above 50° C. after 30 minutes.

Also of interest for evaluating foamable composition, is the syneresis build over time. The syneresis has been measured as the weight of the liquid collected at the bottom of the cup at the end of the stability test. The liquid has been pipetted with a micropipette and the collected volume weight on precision balance. The syneresis is measured in g.

Finally, as for any food product the sensoric is a key and the evaluation has been done using a score range from 5 (very good) to 1 (not acceptable). The sensoric evaluation is holistic and includes the stability, the mouthfeel, the taste and the color of the foamable product.

In a preferred embodiment in combination with any of the above or below embodiments, the sweet, spicy or salty foam is a dish on its own, a topping, a filling, a decoration, a seasoning/condiment, or an ingredient for an appetizer, entrée, soup, main course meal, side dish, cheese, dessert, bakery, confectionary or any other food or beverage where foam is desirable.

According to the present invention, a beverage is meant to encompass carbonated and non-carbonated beverages, water and flavored water, juice from fruit and vegetable, sport drinks, energy drinks; teas, coffee, cocoa, beverages containing milk; fruit milk beverages, drinkable yogurt, lactic acid bacteria beverages, alcoholic drinks (beverage containing alcohol) such as beer, bilibili, boza, cider, ginger ale, kvass, poiré, wine, fruit wine, sparkling wine e. g. champagne, fortified wine (e. g. Port, Madeira, Marsala, Sherry, Vermouth, Vinsanto), mead, Saké, distilled alcoholic drinks as absinthe, akvavit, arack, ouzo, pastis, raki, sambuca, brandy (e. g. armagnac, cognac, metaxa, singani), calvados, everclear, ginebra, grappa, jenever, rum, shochu, soju, spirit, tequila, vodka, whisky, whiskey and liqueurs (e.g. fruit liqueurs, coffee liqueur, cream liqueur, herbal liqueur, whisky liqueur, cacao liqueur) and the like served cold, at ambient temperature or hot.

In the context of the present invention, solid food includes milk products of smooth consistence such as all types of cheese, desserts, icecream and yogurts, and other products such as condiments, sauces, jellies, bakery products with or without filling, cereals or processed meat products.

Surprisingly, the present invention provides a vegan, non-allergen, low fat or fat-free, low energy, fiber-containing food product.

EXAMPLES

The following not limiting examples further describe the invention.

Example 1

Raspberry Foam for Dessert 1 wt % of carob germ flour, 1.20 wt % of pectin, 0.05 wt % of xanthan gum and 0.6 wt % of citrus fiber are pre-blended with 15 wt % sugar and dispersed in 57 wt % warm water and 0.3 wt % of a 50 wt % aqueous solution of citric acid at up to 80° C. temperature.

Separately, an aqueous solution of 8 wt % of water, 5.0 wt % raspberry fruit juice concentrate and 3.2 wt % sucrose syrup is prepared to which the dispersion is added.

The mixture is stirred at an adequate revolution for 5 minutes in a tank designed for eliminating air incorporation, followed by the addition of 8.2 wt % of water, 0.25 wt % of a colorant, 0.20 wt % of a flavouring agent.

In a plate heat exchanger the resulting mixture is heated up to 93° C. and maintained at this temperature for 1 min and rapidly cool down to 15° C. and aseptically filled in pre-sterilized aerosol cans with 3.0 wt % sterile nitrous oxide gas at 16 bar under agitation.

The aerosol cans are shelf-stable for up to two years at room temperature.

The raspberry foamable composition is a suitable fat-free (less than 0.1 wt % fat) vegan source of fiber having more than 1.5 g fiber per 100 kcal and containing less than 0.7 wt % protein.

The foam, which has an overrun of 626% and a stability of 95% after 60 minutes at room temperature, contains less than 0.8 kJ/ml; therefore it is a low energy, fat-free source of fiber suitable for vegan diet.

After cleaning the dispensing valve, the aerosol can be stored again until the end of the shelf-life.

Example 2

Peach Foam for Hot Black Tea 1.4 wt % of wheat germ flour, 0.7 wt % of pectin, 0.01 wt % of xantham gum, 0.01 wt % of gellan gum, 6.0 wt % corn dextrin (Fibersol-2®) and 1.0 wt % of citrus fiber are dispersed in 40 wt % hot water acidified with 0.15 wt % of a 50 wt % aqueous citric acid solution with an high-shear turbo mixer under room temperature.

The slurry is transferred in a larger tank with stirrer and double jacket, 9.0 wt % of sucrose is mixed under gentle agitation for 10 minutes till fully dissolved. Subsequently 30 wt % single strength peach juice is added, followed by the addition of 0.30 wt % of a colorant, 1.20 wt % of a flavouring agent and 10.23 wt % water, whereas the stirrer is kept on a few minutes for insuring homogenuous mixture prior heating. The resulting mixture is heated up to 94° C. and maintained at this temperature for 50 seconds and rapidly cool down to 20° C. with a tubular heat exchanger and aseptically filled in aseptic cardboard packs.

The cardboard packs are shelf-stable for up to two years at room temperature, so that efficient distribution channel can be used.

The peach foamable composition is a suitable fat-free (less than 0.2 wt % fat) vegan source of fiber having more than 6 g fiber per 100 g and containing less than 0.7 wt % protein.

Refrigerating, short prior utilization of the foamed composition, the cardboard pack for a sufficient amount of time until the temperature is below 10° C.

The peach foam, which has an overrun of 380% and a stability of 85% after 30 minutes floating on the tea, contains less than 0.8 kJ/ml; therefore it is a low energy, fat-free, high fiber foam suitable for vegan diet.

By using capsules with pressurized $N_2O$ or $CO_2$ gas for foaming, microbiological growth can be inhibited.

Example 3

Cucumber Spearmint Foam for Cracker Appetizer 6.0 wt % corn dextrin (Fibersol-2®) are dispersed in 15 wt % hot water acidified with 0.35 wt % lactic acid with a high-shear turbo mixer under room temperature.

The fiber slurry is transferred in a larger buffer tank with stirrer and double jacket and continuously mixed under gentle agitation.

1.6 wt % of carob germ flour are dispersed in 5 wt % hot water with a high-shear turbo mixer.

The germ flour slurry is transferred in the buffer tank and is continuously mixed with the fiber slurry under gentle agitation.

1.5 wt % of pectin and 0.05 wt % of xanthan gum are dispersed in 4.0 wt % fruit juice concentrate (Fruit-Up®) and 60 wt % hot water with an high-shear turbo mixer.

The thickener slurry is transferred in the buffer tank and mixed with the slurry under gentle agitation a few minutes for insuring homogeneous mixture prior heating.

The resulting mixture is heated up to 92° C. and maintained at this temperature for 80 seconds and rapidly cool down to 20° C. with a tubular heat exchanger and staple in an aseptic tank with a stirred.

0.3 wt % spearmint extract, 0.05 wt % Stevia, 0.5 wt % colouring foodstuff, 0.15 wt % flavouring and 0.15 wt % salt are dispersed in 2.0 wt % cucumber juice concentrate and 2.0 wt % hot water with an high-shear turbo mixer and heat up to 102° C. by 1.35 kg direct steam injection and kept for 6 seconds at the pasteurization temperature prior to be transfer in the aseptic tank.

The cucumber spearmint foamable composition is filled aseptically in cardboard packs.

The cardboard packs are shelf-stable for up to two years at room temperature, so that efficient distribution channel can be used.

The cucumber spearmint foamable composition is a suitable fat-free (less than 0.2 wt % fat) vegan source of fiber having more than 6 g fiber per 100 g and containing less than 1.5 wt % protein.

The cardboard pack is refrigerated prior utilization of the foamed composition until the temperature is below 10° C.

The cucumber spearmint foam, which has an overrun of 352% and a stability of 90% after 60 minutes, contains less than 0.4 kJ/ml; therefore it is a low energy, low-sugar, fat-free, high fiber foam suitable for vegan diet.

By using capsules with pressurized $N_2O$ or $CO_2$ gas for foaming, microbiological growth can be inhibited.

Example 4

Nutritional Foam 6.0 wt % corn dextrin (Fibersol-2®) and 0.25 wt % of citrus fiber are dispersed in 17.15 wt % hot water acidified with 0.35 wt % lactic acid with a high-shear turbo mixer under room temperature.

The fiber slurry is transferred in a larger buffer tank with stirrer and double jacket and continuously mixed under gentle agitation.

1.7 wt % of carob germ flour are dispersed in 9 wt % hot water with a high-shear turbo mixer.

The germ flour slurry is transferred in the buffer tank and is continuously mixed with the fiber slurry under gentle agitation.

1.5 wt % of pectin and 0.05 wt % of xanthan gum are dispersed in 4.0 wt % fruit juice concentrate (Fruit-Up®) and 60 wt % hot water with an high-shear turbo mixer.

The thickener slurry is transferred in the buffer tank and mixed with the slurry under gentle agitation a few minutes for insuring homogeneous mixture prior heating.

The resulting mixture is heated up to 130° C. and maintained at this temperature for 25 seconds and rapidly cool down to 20° C. with a tubular heat exchanger and stapled in an aseptic tank with a stirred prior being filled aseptically in cardboard packs.

The foamable composition has a neutral taste and a yellowish color.

The cardboard packs are shelf-stable for up to two years at room temperature, so that efficient distribution channel can be used.

The neutral bulk foamable composition is a suitable fat-free (less than 0.2 wt % fat) vegan source of fiber having more than 6 g fiber per 100 g and containing less than 1.0 wt % protein.

The cardboard pack is refrigerated prior utilization of the foamed composition until the temperature is below 10° C.

After refrigeration, the foamable composition is dosed in a beaker and mixed with up to 10 wt % flavored compound (e. g. from ADM) or freshly prepared fluid ingredient or mixture thereof and foamed using a pressurizable siphon.

By using capsules with pressurized $N_2O$ or $CO_2$ gas for foaming, microbiological growth can be inhibited.

Table 2 below summarizes the compositions of Examples 1 to 4.

TABLE 2

| | Example 1 | Example 2 | Example 3 | Example 4 |
|---|---|---|---|---|
| Water (wt %) | 73.2 | 50.23 | 83.35 | 86.15 |
| Fruit or plant extract (wt %) | Raspberry juice concentrate 5.0 | Peach juice 30.00 | Cucumber juice concentrate 2.0 Spearmint 0.30 | Fruit juice concentrate (Fruit-Up ®) 4.0 |
| Plant germ flour (wt %)r | Carob germ flour 1.00 | Wheat germ flour 1.40 | Carob germ flour 1.60 | Carob germ flour 1.70 |
| Pectin (wt %) | 1.20 | 0.70 | 1.50 | 1.50 |
| Xanthan (wt %) | 0.05 | 0.01 | 0.05 | 0.05 |
| Gellan (wt %) | — | 0.01 | — | — |
| Corn dextrin (wt %) | — | 6.00 | 6.00 | 6.00 |
| Citrus fiber (wt %) | 0.60 | 1.00 | — | 0.25 |
| Sweetener (wt %) | Sucrose: 15.0 Sucrose syrup, 66.5 Bx: 3.2 | 9.00 | Fruit Juice Conc. (Fruit-Up®) 4.00 0.05 Stevia | — |
| Colorant (wt %) | 0.25 | 0.30 | 0.5 | — |
| Flavouring agent (wt %) | 0.2 | 1.20 | 0.15 0.15 Salt | — |
| Organic acid (wt %) | 0.30 (50 wt % aqueous solution of citric acid (wt %) | 0.15 | 0.35 (lactic acid) | 0.35 (lactic acid) |

TABLE 2-continued

|  | Example 1 | Example 2 | Example 3 | Example 4 |
|---|---|---|---|---|
| Overrun (%) | 626 | 380 | 352 | 700 |
| Stability (%) | 95 | 85 (hot) | 90 | 97 |
| Syneresis (g) cold | 0.4 | 0.15 | 0.6 | 0.35 |

Comparative Example 1

Raspberry Foam for Dessert 0.6 wt % of carob germ flour and 1.0 wt % of citrus fiber are pre-blended with 18 wt % sugar and dispersed in 57 wt % warm water and 0.3 wt % of a 50 wt % aqueous solution of citric acid at up to 80° C. temperature.

Separately, an aqueous solution of 8 wt % of water and 9.5 wt % raspberry fruit juice concentrate is prepared to which the dispersion is added.

The mixture is stirred at an adequate revolution for 5 minutes in a tank designed for eliminating air incorporation, followed by the addition of 5.15 wt % of water, 0.25 wt % of a colorant, 0.20 wt % of a flavouring agent.

In a tubular heat exchanger the resulting mixture is heated up to 93° C. and maintained at this temperature for 1 min and rapidly cool down to 15° C. and aseptically filled in pre-sterilized aerosol cans with 3.0 wt % sterile nitrous oxide gas at 16 bar under agitation.

The aerosol cans are shelf-stable for up to two years at room temperature.

The raspberry foamable composition contains less than 0.1 wt % fat and less than 0.7 wt % protein.

The foam has an overrun of 160% and a stability of 67% after 60 minutes at room temperature and contains more than 0.8 kJ/ml.

After cleaning the dispensing valve, the aerosol can be stored again until the end of the shelf-life.

Comparative Example 2

Raspberry Foam for Dessert 1.00 wt % of pectin and 0.2 wt % of xanthan gum are pre-blended with 30 wt % sugar and dispersed in 37 wt % warm water and 0.3 wt % of a 50 wt % aqueous solution of citric acid at up to 80° C. temperature.

Separately, an aqueous solution of 8 wt % of water and 9.5 wt % raspberry fruit juice concentrate is prepared to which the dispersion is added.

The mixture is stirred at an adequate revolution for 5 minutes in a tank designed for eliminating air incorporation, followed by the addition of 13.55 wt % of water, 0.25 wt % of a colorant, 0.20 wt % of a flavouring agent.

In a tubular heat exchanger the resulting mixture is heated up to 93° C. and maintained at this temperature for 1 min and rapidly cool down to 15° C. and aseptically filled in pre-sterilized aerosol cans with 3.0 wt % sterile nitrous oxide gas at 16 bar under agitation.

The aerosol cans are shelf-stable for up to two years at room temperature.

The raspberry foamable composition contains less than 0.1 wt % fat and less than 0.7 wt % protein.

The foam has an overrun of 125% and a stability of 45% after 60 minutes at room temperature and contains more than 0.8 kJ/ml.

After cleaning the dispensing valve, the aerosol can be stored again until the end of the shelf-life.

Comparative Example 3

Raspberry Foam for Dessert 0.80 wt % of pectin, 0.10 wt % of xanthan gum and 0.5 wt % of citrus fiber are pre-blended with 18 wt % sugar and dispersed in 57 wt % warm water and 0.3 wt % of a 50 wt % aqueous solution of citric acid at up to 80° C. temperature.

Separately, an aqueous solution of 8 wt % of water and 9.5 wt % raspberry fruit juice concentrate is prepared to which the dispersion is added.

The mixture is stirred at an adequate revolution for 5 minutes in a tank designed for eliminating air incorporation, followed by the addition of 5.35 wt % of water, 0.25 wt % of a colorant, 0.20 wt % of a flavouring agent.

In a tubular heat exchanger the resulting mixture is heated up to 93° C. and maintained at this temperature for 1 min and rapidly cool down to 15° C. and aseptically filled in pre-sterilized aerosol cans with 3.0 wt % sterile nitrous oxide gas at 16 bar under agitation.

The aerosol cans are shelf-stable for up to two years at room temperature.

The raspberry foamable composition contains less than 0.1 wt % fat and less than 0.7 wt % protein.

The foam has an overrun of 348% and a stability of 30% after 60 minutes at room temperature and contains more than 0.8 kJ/ml.

After cleaning the dispensing valve, the aerosol can be stored again until the end of the shelf-life.

Comparative Example 4

Raspberry Foam for Dessert 7 wt % of carob germ flour, 4 wt % of wheat germ flour 0.40 wt % of pectin, 0.02 wt % of xanthan gum, 15 wt % corn dextrin (Fibersol®) and 0.2 wt % of citrus fiber are pre-blended with 15 wt % sugar and dispersed in 40 wt % warm water, 5.0 wt % raspberry fruit juice concentrate and 0.3 wt % of a 50 wt % aqueous solution of citric acid at up to 80° C. temperature.

The mixture is stirred at an adequate revolution for 5 minutes in a tank designed for eliminating air incorporation, followed by the addition of 3.2 wt % sucrose syrup, 9.43 wt % of water, 0.25 wt % of a colorant, 0.20 wt % of a flavouring agent.

In a tubular heat exchanger the resulting mixture is heated up to 93° C. and maintained at this temperature for 1 min and rapidly cool down to 15° C. and aseptically filled in pre-sterilized aerosol cans with 3.0 wt % sterile nitrous oxide gas at 16 bar under agitation.

The aerosol cans are shelf-stable for up to two years at room temperature.

The raspberry foamable composition is a suitable vegan rich (high) source of fiber having more than 3.0 g fiber per 100 kcal.

The foam has an overrun of 257% and a stability of 35% after 60 minutes at room temperature and contains more than 0.8 kJ/ml.

After cleaning the dispensing valve, the aerosol can be stored again until the end of the shelf-life.

Comparative Example 5

Raspberry Foam for Dessert 0.05 wt % of wheat germ flour 0.90 wt % of pectin, 0.02 wt % of xanthan gum and 33 wt % corn dextrin (Fibersol®) are pre-blended with 5 wt % sugar and dispersed in 47 wt % warm water, 5.0 wt % raspberry fruit juice concentrate and 0.3 wt % of a 50 wt % aqueous solution of citric acid at up to 80° C. temperature.

The mixture is stirred at an adequate revolution for 5 minutes in a tank designed for eliminating air incorporation, followed by the addition of 8.28 wt % of water, 0.25 wt % of a colorant, 0.20 wt % of a flavouring agent.

In a tubular heat exchanger the resulting mixture is heated up to 93° C. and maintained at this temperature for 1 min and rapidly cool down to 15° C. and aseptically filled in pre-sterilized aerosol cans with 3.0 wt % sterile nitrous oxide gas at 16 bar under agitation.

The aerosol cans are shelf-stable for up to two years at room temperature.

The raspberry foamable composition is a suitable fat-free (less than 0.1 wt % fat) vegan rich (high) source of fiber having more than 3.0 g fiber per 100 kcal and containing less than 0.7 wt % protein.

The foam has an overrun of 145% and a stability of 75% after 60 minutes at room temperature and contains more than 0.8 kJ/ml.

After cleaning the dispensing valve, the aerosol can be stored again until the end of the shelf-life.

Table 3 below summarizes the compositions of Comparative Examples 1 to 4.

TABLE 3

| | Comparative Example 1 | Comparative Example 2 | Comparative Example 3 | Comparative Example 4 | Comparative Example 5 |
|---|---|---|---|---|---|
| Water (wt %) | 70.15 | 58.55 | 70.35 | 49.43 | 55.28 |
| Fruit or plant extract (wt %) | Raspberry juice concentrate 9.5 | Raspberry juice concentrate 9.5 | Raspberry juice concentrate 9.5 | Raspberry juice concentrate 5.0 | Raspberry juice concentrate 5.0 |
| Carob germ flour (wt %) | Carob germ flour 0.60 | Carob germ flour — | Carob germ flour — | Carob germ flour 7.00 | Carob germ flour — |
| Wheat germ flour | | | | Wheat germ Flour 4.00 | Wheat germ Flour 0.05 |
| Thickener 1 (wt %) | — | 1.00 Pectin | 0.80 Pectin | 0.40 Pectin | 0.90 Pectin |
| Thickener 2 (wt %) | — | 0.2 Xanthan | 0.1 Xanthan | 0.02 Xanthan | 0.02 Xanthan |
| Corn dextrin (wt %) | — | — | — | 15.0 | 33 |
| Citrus fiber (wt %) | 1.00 | — | 0.5 | 0.20 | — |
| Sweetener (wt %) | Sucrose: 18.0 | Sucrose: 30.0 | Sucrose: 18.0 | Sucrose: 15.0 Sucrose syrup, | Sucrose: 5.0 |

18

TABLE 3-continued

| | Comparative Example 1 | Comparative Example 2 | Comparative Example 3 | Comparative Example 4 | Comparative Example 5 |
|---|---|---|---|---|---|
| | | | | 66.5 Bx: 3.2 | |
| Colorant (wt %) | 0.25 | 0.25 | 0.25 | 0.25 | 0.25 |
| Flavouring agent (wt %) | 0.2 | 0.2 | 0.2 | 0.2 | 0.2 |
| Organic acid (wt %) | 0.30 (50 wt % aq. solution of citric acid (wt %) | 0.30 (50 wt % aq. solution of citric acid (wt %) | 0.30 (50 wt % aq. solution of citric acid (wt %) | 0.30 (50 wt % aq. solution of citric acid (wt %) | 0.30 (50 wt % aq. solution of citric acid (wt %) |
| Overrun | 160 | 125 | 348 | 257 | 145 |
| Stability (%) | 67 | 45 | 30 | 35 | 75 |
| Syneresis (g) | >5 | >5 | >5 | 3.68 | 2.35 |

As can be seen from the Examples and Comparative Examples, the foamable composition of the present invention shows an improved overrun, higher stability and lower syneresis.

The invention claimed is:

1. A foamable composition comprising:
   a) 0.8 to 3 wt % carob germ flour or 1.0 to 3.5 wt % wheat germ flour;
   b) 0.5 to 10 wt % of a thickening agent;
   c) 0.1 to 35 wt % of a natural fiber; and
   d) water;
   wherein each wt % is based on the total weight of the foamable composition.

2. The foamable composition of claim 1, further comprising at least one additive selected from the group consisting of a sweetener, a colorant, a flavouring agent, a flavor enhancer, a pH regulator, an acidifying agent, a preservative, a mineral, an antioxidant and a natural organic acid,
   wherein the at least one additive comprises 1.0 to 50 wt % of the total weight of the foam able composition.

3. The foamable composition of claim 1, wherein the thickening agent is a polysaccharide or a mixture thereof.

4. The foamable composition of claim 3, wherein the polysaccharide is xanthan gum, pectin, gellan gum, dextran, pullulan or a mixture thereof.

5. The foamable composition of claim 1, wherein the natural fiber is a soluble fiber, an insoluble fiber or a mixture thereof.

6. The foamable composition of claim 5, wherein the natural fiber is selected from the group consisting of an edible indigestible soluble and an insoluble carbohydrate polymer, or a mixture thereof.

7. The foamable composition of claim 1, further comprising an extract of an edible plant or part of an edible plant, which comprises 0.1 to 50 wt % of the total weight of the foamable composition.

8. The foamable composition of claim 7, wherein the extract of an edible plant or part of an edible plant is an extract of a plant selected from the group consisting of a vegetable, a fruit, a herb, a spice, a seed, tea, cocoa and coffee.

9. The foamable composition of claim 1, further comprising a food extract, which comprises 0.1 to 50 wt % of the total weight of the foamable composition.

* * * * *